(12) United States Patent
Mizutori et al.

(10) Patent No.: US 12,179,388 B2
(45) Date of Patent: Dec. 31, 2024

(54) SMC MANUFACTURING METHOD

(71) Applicant: Mitsubishi Chemical Corporation, Tokyo (JP)

(72) Inventors: Yukihiro Mizutori, Tokyo (JP); Junji Kanehagi, Tokyo (JP); Yasushi Watanabe, Tokyo (JP); Tadao Samejima, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 166 days.

(21) Appl. No.: 17/865,288

(22) Filed: Jul. 14, 2022

(65) Prior Publication Data

US 2022/0347890 A1   Nov. 3, 2022

Related U.S. Application Data

(63) Continuation of application No. PCT/JP2021/001014, filed on Jan. 14, 2021.

(30) Foreign Application Priority Data

Jan. 21, 2020 (WO) .................. PCT/JP2020/001851
Mar. 18, 2020 (JP) ................................ 2020-047205

(51) Int. Cl.
   *B29B 15/10* (2006.01)
   *B29C 70/50* (2006.01)
   (Continued)

(52) U.S. Cl.
   CPC ............ *B29B 15/105* (2013.01); *B29C 70/50* (2013.01); *B29K 2101/10* (2013.01); *B29K 2307/04* (2013.01)

(58) Field of Classification Search
   CPC .............................. B29B 15/105; B29C 70/50
   (Continued)

(56) References Cited

U.S. PATENT DOCUMENTS 6,385,828 B1   5/2002   Kiss et al.
2009/0314870 A1   12/2009   Kiriyama et al.
(Continued)

FOREIGN PATENT DOCUMENTS

CN   107848146 A   3/2018
CN   109312502 A   2/2019
(Continued)

OTHER PUBLICATIONS

Ikeda, K. et al, Machine translation to English for JP-2007092218-A with full foreign patent application attached, Apr. 12, 2007. (Year: 2007).*
(Continued)

*Primary Examiner* — S. Behrooz Ghorishi
*Assistant Examiner* — Gregory C. Grosso
(74) *Attorney, Agent, or Firm* — Morgan, Lewis & Bockius LLP

(57) ABSTRACT

Provided is a useful improvement in a manufacturing method of a CF-SMC using a partially split continuous carbon fiber bundle. The manufacturing method of an SMC of the present invention includes (i) a step of drawing out a continuous carbon fiber bundle (10) from a package, the continuous carbon fiber bundle (10) having a filament number of NK and partially split into n sub-bundles in advance, (ii) a step of chopping the continuous carbon fiber bundle (10) drawn out from the package with a rotary cutter (234) into chopped carbon fiber bundles (20), and (iii) a step of depositing the chopped carbon fiber bundles (20) on a carrier film (41) traveling below the rotary cutter (234) to form a carbon fiber mat (30). In the manufacturing method, due to a fragmentation processing, in which at least some of the chopped carbon fiber bundles before being deposited on the carrier film (41) are fragmented by being brought into contact with a rotating body, a distribution of the filament
(Continued)

number of the chopped carbon fiber bundles in the carbon fiber mat (30) is made different from that when the fragmentation processing is not performed.

13 Claims, 11 Drawing Sheets

(51) Int. Cl.
  *B29K 101/10* (2006.01)
  *B29K 307/04* (2006.01)
(58) Field of Classification Search
  USPC .......................................................... 156/166
  See application file for complete search history.

(56) References Cited

U.S. PATENT DOCUMENTS

| | | | |
|---|---|---|---|
| 2012/0213997 | A1 | 8/2012 | Wang et al. |
| 2017/0355550 | A1 | 12/2017 | Kawahara et al. |
| 2018/0194082 | A1 | 7/2018 | Samejima et al. |
| 2019/0161890 | A1 | 5/2019 | Motohashi et al. |
| 2019/0177887 | A1 | 6/2019 | Motohashi et al. |
| 2020/0277455 | A1 | 9/2020 | Kanehagi et al. |
| 2021/0032067 | A1* | 2/2021 | Kuroda ............... D04H 1/4242 |
| 2021/0347600 | A1 | 11/2021 | Kanehagi et al. |

FOREIGN PATENT DOCUMENTS

| | | |
|---|---|---|
| EP | 0835953 A2 | 4/1998 |
| EP | 3395526 A1 | 10/2018 |
| EP | 3395551 A1 | 10/2018 |
| JP | S62-046468 B2 | 10/1987 |
| JP | H07-257818 A | 10/1995 |
| JP | H09-012220 A | 1/1997 |
| JP | H10-316311 A | 12/1998 |
| JP | 2007-092218 A | 4/2007 |
| JP | 2009-221017 A | 10/2009 |
| JP | 2010-001597 A | 1/2010 |
| JP | 2010-163536 A | 7/2010 |
| JP | 2017-177522 A | 10/2017 |
| WO | 2008/029740 A1 | 3/2008 |
| WO | 2016/104154 A1 | 6/2016 |
| WO | 2017/006989 A1 | 1/2017 |
| WO | 2017/111056 A1 | 6/2017 |
| WO | 2017/221655 A1 | 12/2017 |
| WO | 2017/221688 A1 | 12/2017 |
| WO | 2019/098370 A1 | 5/2019 |
| WO | 2019/151076 A1 | 8/2019 |
| WO | 2020/158496 A1 | 8/2020 |

OTHER PUBLICATIONS

Sumida A. et al, Machine translation to English for RU-2289507-C2 with full foreign patent attached, Dec. 20, 2006. (Year: 2006).*
Ikeda, K. et al, Machine translation to English for JP-2007092218-A with full foreign patent application attached, Apr. 12, 2007. (Year: 2007). (See NPL document filed on Mar. 27, 2024).*
International Search Report issued in related International Patent Application No. PCT/JP2020/001851 dated Mar. 24, 2020.
Third Party Observation filed in related International Patent Application No. PCT/JP2020/001851 dated May 7, 2021.
International Search Report issued in related International Patent Application No. PCT/JP2021/001014 dated Apr. 13, 2021.
Notification (Information Statement) indicating filing of Third Party Submission in Japanese Patent Application No. 2020-569525 dated Dec. 7, 2021.
Office Action issued in related Taiwanese Patent Application No. 110102139 dated Jan. 25, 2022.
Extended European Search Report issued in related European Patent Application No. 20748420.5 dated Feb. 17, 2022.
Extended European Search Report issued in related European Patent Application No. 21744794.5 dated Jun. 23, 2023.
Office Action issued in related Chinese Patent Application No. 202080011105.0 dated Jun. 29, 2022.
Extended European Search Report issued Feb. 20, 2024 for European Patent Application No. 23206395.8.
Office Action issued in related Taiwan Patent Application No. 110102139 dated Sep. 21, 2022.
Office Action issued Mar. 18, 2024 for Chinese Patent Application No. 202180009443.5.

* cited by examiner

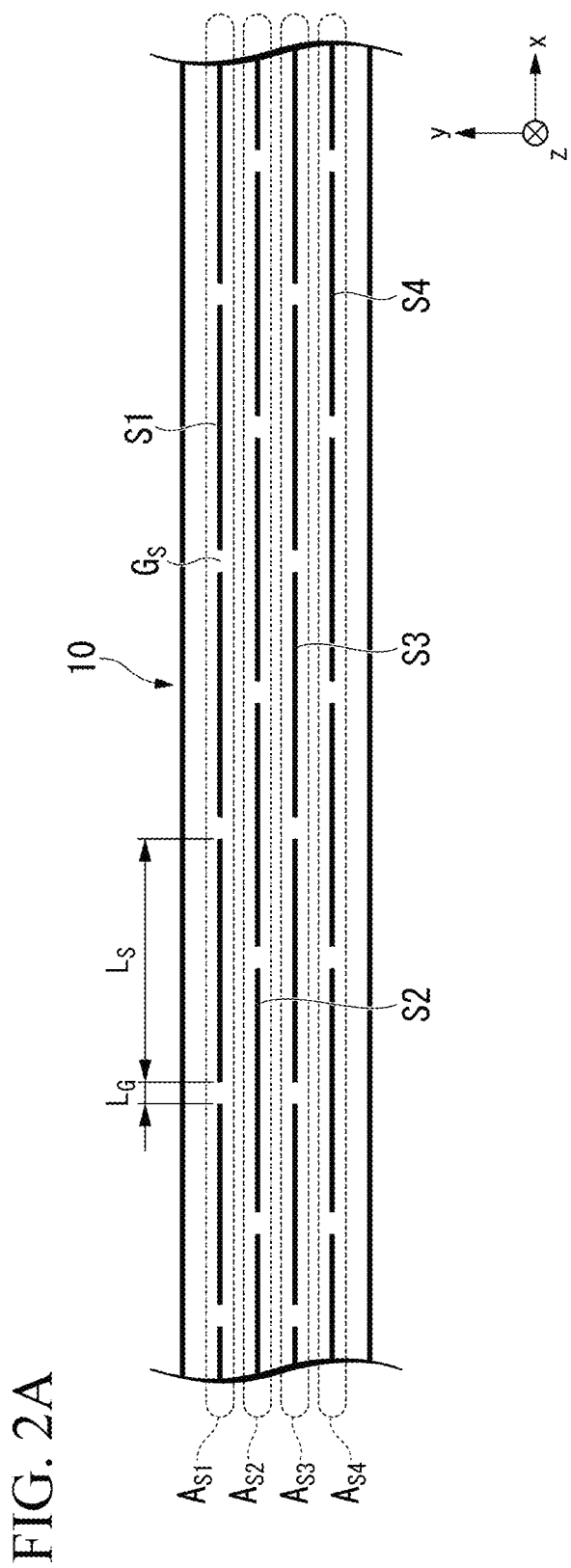

SMC MANUFACTURING METHOD

This application is a continuation application of International Application No. PCT/JP2021/001014, filed on Jan. 14, 2021, which claims the benefit of priority of the prior International Application No. PCT/JP2020/001851, filed Jan. 21, 2020, and Japanese Patent Application No. 2020-047205, filed Mar. 18, 2020, the contents of which are incorporated herein by reference.

TECHNICAL FIELD

The present invention relates to a manufacturing method of an SMC (sheet molding compound), and particularly relates to a manufacturing method of a CF-SMC which is an SMC using carbon fiber (CF).

BACKGROUND ART

In recent years, CFRP (carbon fiber reinforced plastic) which is a composite material comprising a carbon fiber and a resin has been widely used for components of aircraft, automobiles, ships, and other various transportation vehicles, sports goods, and leisure goods.

A certain type of CFRP products is molded from the CF-SMC by using a compression molding method.

The CF-SMC is a type of carbon fiber prepregs, and has a structure in which a mat comprising chopped carbon fiber bundles (also referred to as a "chopped carbon fiber tow" or a "chopped carbon fiber strand") is impregnated with a thermosetting resin composition.

The CFRP has higher strength when being reinforced with a carbon fiber bundle having a smaller filament number. On the other hand, the carbon fiber bundle requires a higher manufacturing cost when having a smaller filament number (smaller tow size) (Patent Document 1).

It is proposed adding a step of partially splitting a continuous carbon fiber bundle unwound from a creel before chopping to an SMC manufacturing method in which steps are continuously performed from chopping of the continuous carbon fiber bundle to resin impregnation of a carbon fiber mat (Patent Document 2).

CITATION LIST

Patent Documents

[Patent Document 1]
United States Patent Application, Publication No. 2012/0213997
[Patent Document 2]
PCT International Publication No. WO2017/221655

SUMMARY OF INVENTION

Technical Problem

It is expected that an SMC which can give a high-strength CFRP molded product can be manufactured at low cost by using a technique of partially splitting before use a continuous carbon fiber bundle having a large filament number classified as a regular tow or a large tow.

Because various adjustments are required in the step of partially splitting the continuous carbon fiber bundle, overall manufacturing efficiency may be improved when the step and subsequent steps are separated in manufacturing the SMC.

The present invention is made in a process of studies performed by the present inventors, based on the above-described idea, and mainly aims to provide a useful improvement in a CF-SMC manufacturing technique including a CF-SMC manufacturing method of partially splitting before use the continuous carbon fiber bundle.

In some cases, the present specification may explicitly or implicitly disclose problems which can be solved by each embodiment of the present invention.

Solution to Problem

An aspect of the present invention relates to a manufacturing method of a sheet molding compound.

The manufacturing method of the sheet molding compound according to a preferred embodiment of the present invention includes, but not limited to the followings.

[a1] A manufacturing method of a sheet molding compound, comprising: (i) a step of drawing out a continuous carbon fiber bundle from a package, the continuous fiber bundle having a filament number of NK and partially split into n sub-bundles in advance, (ii) a step of chopping the continuous carbon fiber bundle drawn out from the package with a rotary cutter into chopped carbon fiber bundles, and (iii) a step of depositing the chopped carbon fiber bundles on a carrier film traveling below the rotary cutter to form a carbon fiber mat, wherein a fragmentation processing is performed so that at least some of the chopped carbon fiber bundles before being deposited on the carrier film are fragmented by being brought into contact with a rotating body.

[a2] The manufacturing method according to [a1], wherein in the package, the continuous carbon fiber bundle is wound so that there is no gap between the sub-bundles.

[a3] The manufacturing method according to [a1] or [a2], wherein in the package, the continuous carbon fiber bundle is wound so that the adjacent sub-bundles overlap each other.

[a4] The manufacturing method according to any one of [a1] to [a3], wherein a total width of the continuous carbon fiber bundle wound in the package is smaller than a total sum of widths of the sub-bundles.

[a5] The manufacturing method according to any one of [a1] to [a4], wherein the filament number NK of the continuous carbon fiber bundle is 12K or more.

[a6] The manufacturing method according to any one of [a1] to [a5], wherein the rotating body is a pin roller having a rotation axis parallel to a rotation axis direction of the rotary cutter.

[a7] The manufacturing method according to any one of [a1] to [a6], comprising using a fragmentation processing apparatus in the fragmentation processing, wherein the fragmentation processing apparatus comprises a first pin roller and a second pin roller each having a rotation axis parallel to a rotation axis direction of the rotary cutter and a sum of a maximum radius of the first pin roller and a maximum radius of the second pin roller is larger than a distance between the rotation axes of the first pin roller and the second pin roller.

[a8] The manufacturing method according to any one of [a1] to [a7], wherein a content of a carbon fiber bundle having a filament number of more than 0.5K in the carbon fiber mat is 99% by weight or more.

[a9] The manufacturing method according to any one of [a1] to [a8], wherein the fragmentation processing reduces a number of the chopped carbon fiber bundle having a filament number of larger than {(N/n)+0.5}K included in a unit weight of the carbon fiber mat.

[a10] The manufacturing method according to any one of [a1] to [a9], wherein the package is a square end type package.

[a11] The manufacturing method according to [a10], wherein a winding ratio in the package is not an integer.

[a12] The manufacturing method according to [a10] or [a11], wherein a fraction of the winding ratio in the package after a decimal point is a multiple of none of ½, ⅓, ¼ and ⅕.

[a13] The manufacturing method according to any one of [a10] to [a12], wherein a lead angle at a start of winding is 5° to 30° and the lead angle at an end of winding is 2° to 17° in the package.

[a14] The manufacturing method according to any one of [a1] to [a13], wherein the carbon fiber mat is pressurized together with a thermosetting resin composition to impregnate the carbon fiber mat with the thermosetting resin composition.

[a15] The manufacturing method according to [a14], wherein at least a part of the thermosetting resin composition is applied to an upper surface of the carrier film before the step (iii).

Another aspect of the present invention relates to a carbon fiber package.

The carbon fiber package according to a preferred embodiment of the present invention includes the followings, but is not limited thereto.

[b1] A carbon fiber package which is a fiber package in which a continuous carbon fiber bundle is traverse-wound on a bobbin, wherein the continuous carbon fiber bundle is partially split into sub-bundles, and a width of the continuous carbon fiber bundle is smaller than a total sum of widths of the sub-bundles.

[b2] A carbon fiber package which is a fiber package in which a continuous carbon fiber bundle is traverse-wound on a bobbin, wherein the continuous carbon fiber bundle is partially split into sub-bundles and is wound on the bobbin so that the sub-bundles overlap each other.

[b3] The carbon fiber package according to [b1] or [b2], wherein the width of the continuous carbon fiber bundle is 90% of the total sum of the widths of the sub-bundles or less.

[b4] The carbon fiber package according to any one of [b1] to [b3], wherein the continuous carbon fiber bundle is partially split into three or more sub-bundles.

[b5] The carbon fiber package according to any one of [b1] to [b4], wherein a filament number of the sub-bundle is 5K or less.

[b6] The carbon fiber package according to any one of [b1] to [b5], wherein a total filament number of the continuous carbon fiber bundle is 12K or more.

[b7] The carbon fiber package according to any one of [b1] to [b6], wherein the carbon fiber package is a square end type package.

[b8] The carbon fiber package according to [b7], wherein a winding ratio is not an integer.

[b9] The carbon fiber package according to [b8], a fraction of the winding ratio after a decimal point is a multiple of none of ½, ⅓, ¼ and ⅕.

[b10] The carbon fiber package according to any one of [b7] to [b9], wherein a lead angle at a start of winding is 5° to 30° and the lead angle at an end of winding is 2° to 17°.

The following [b11] and [b12] are also included in the embodiments of the present invention.

[b11] A manufacturing method of a sheet molding compound comprising using the carbon fiber package according to any one of [b1] to [b10].

[b12] Use of the carbon fiber package according to any one of [b1] to [b10] in manufacturing a sheet molding compound.

Still another aspect of the present invention relates to a manufacturing method of a carbon fiber package.

The manufacturing method of a carbon fiber package according to a preferred embodiment of the present invention includes, but not limited to the followings.

[c1] A manufacturing method of a carbon fiber package in which a continuous carbon fiber bundle is traverse-wound on a bobbin, comprising a splitting step of partially splitting a continuous carbon fiber bundle into sub-bundles and a winding step of winding the continuous carbon fiber bundle partially split into the sub-bundles on a bobbin, wherein in the winding step, the continuous carbon fiber bundle is wound on the bobbin so that a width of the continuous carbon fiber bundle is smaller than a total sum of widths of the sub-bundles.

[c2] A manufacturing method of a carbon fiber package in which a continuous carbon fiber bundle is traverse-wound on a bobbin, comprising a splitting step of partially splitting a continuous carbon fiber bundle into sub-bundles and a winding step of winding the continuous carbon fiber bundle partially split into the sub-bundles on a bobbin, wherein in the winding step, the continuous carbon fiber bundle is wound on the bobbin so that the sub-bundles overlap each other.

[c3] The manufacturing method of a carbon fiber package according to [c1] or [c2], wherein in the winding step, the continuous carbon fiber bundle is wound on the bobbin so that the width of the continuous carbon fiber bundle is 90% of the total sum of the widths of the sub-bundles or less.

[c4] The manufacturing method of a carbon fiber package according to any one of [c1] to [c3], wherein in the splitting step, the continuous carbon fiber bundle is partially split into three or more sub-bundles.

[c5] The manufacturing method of a carbon fiber package according to any one of [c1] to [c4], wherein a filament number of the sub-bundle is 5K or less.

[c6] The manufacturing method of a carbon fiber package according to any one of [c1] to [c5], wherein a total filament number of the continuous carbon fiber bundle is 12K or more.

[c7] The manufacturing method of a carbon fiber package according to any one of [c1] to [c6], wherein the fiber package is a square end type package.

[c8] The manufacturing method of a carbon fiber package according to [c7], wherein a winding ratio is not an integer in the winding step.

[c9] The manufacturing method of a carbon fiber package according to [c8], wherein a fraction of the winding ratio after a decimal point is a multiple of none of ½, ⅓, ¼ and ⅕ in the winding step.

[c10] The manufacturing method of a carbon fiber package according to any one of [c7] to [c9], wherein in the winding step, a lead angle at a start of winding is 5° to 30° and the lead angle at an end of winding is 2° to 17°.

The embodiments of the present invention further include a manufacturing method of a sheet molding compound as follows.

[d1] A manufacturing method of a sheet molding compound, comprising (i) a step of drawing out a continuous carbon fiber bundle from a package, (ii) a step of chopping the continuous carbon fiber bundle drawn out from the package with a rotary cutter into chopped carbon fiber bundles, and (iii) a step of depositing the chopped carbon fiber bundles on a carrier film traveling below the rotary cutter to form a carbon fiber mat, wherein a fragmentation processing is performed by using a fragmentation processing apparatus so that at least some of the chopped carbon fiber bundles before being deposited on the carrier film are fragmented by being brought into contact with a rotating body, and wherein the fragmentation processing apparatus comprises a first pin roller and a second pin roller each having a rotation axis parallel to a rotation axis direction of the rotary cutter, and a sum of a maximum radius of the first pin roller and a maximum radius of the second pin roller is larger than a distance between the rotation axes of the first pin roller and the second pin roller.

[d2] The manufacturing method according to [d1], wherein rotation directions of the first pin roller and the second pin roller are opposite to each other.

[d3] The manufacturing method according to [d2], wherein the first pin roller rotates so that a pin moves downward from above on a side facing the second pin roller.

[d4] The manufacturing method according to [d2], wherein the first pin roller rotates so that a pin moves upward from below on a side facing the second pin roller.

[d5] The manufacturing method according to [d1], wherein rotation directions of the first pin roller and the second pin roller are the same.

[d6] The manufacturing method according to any one of [d1] to [d5], wherein a content of a carbon fiber bundle having a filament number of more than 0.5K in the carbon fiber mat is 99% by weight or more.

The following [d7] to [d11] are also included in the embodiments of the present invention.

[d7] Use of a fragmentation processing apparatus, wherein the fragmentation processing apparatus includes a first pin roller and a second pin roller which have a set of rotation axes parallel to each other, and each of which is rotationally driven, a sum of a maximum radius of the first pin roller and a maximum radius of the second pin roller is larger than a distance between the rotation axes of the first pin roller and the second pin roller, and the fragmentation processing apparatus is used for fragmentation processing of chopped carbon fiber bundles.

[d8] The use according to [d7], wherein rotation directions of the first pin roller and the second pin roller are opposite to each other.

[d9] The use according to [d8], wherein the first pin roller rotates so that a pin moves downward from above on a side facing the second pin roller.

[d10] The use according to [d8], wherein the first pin roller may rotate so that a pin moves upward from below on a side facing the second pin roller.

[d11] The use according to [d7], wherein rotation directions of the first pin roller and the second pin roller are the same.

Advantageous Effects of Invention

According to the present invention, there is provided a useful improvement in a CF-SMC manufacturing technique including a CF-SMC manufacturing method in which a continuous carbon fiber is partially split before use.

BRIEF DESCRIPTION OF DRAWINGS

FIG. 2A is a schematic diagram representing a continuous carbon fiber bundle immediately after being partially split into five parts and is a plan view when viewed from a thickness direction.

DESCRIPTION OF EMBODIMENTS

1. SMC Manufacturing Method

An SMC is a sheet-shaped carbon fiber prepreg obtainable by impregnating a carbon fiber mat comprising a chopped carbon fiber bundle with a thermosetting resin composition.

One embodiment of the present invention is an SMC manufacturing method including the following steps (i) to (iii).

(i) A step of drawing out a continuous carbon fiber bundle from a package, the continuous fiber bundle having a filament number of NK and partially split into n sub-bundles in advance.

(ii) A step of chopping the continuous carbon fiber bundle drawn out from the package with a rotary cutter into chopped carbon fiber bundles.

(iii) A step of depositing the chopped carbon fiber bundles on a carrier film traveling below the rotary cutter to form a carbon fiber mat.

In the SMC manufacturing method of the embodiment, fragmentation processing is further performed so that at least some of the chopped carbon fiber bundles before being deposited on the carrier film is fragmented by being brought into contact with a rotating body.

With regard to a technique for impregnating the carbon fiber mat formed through the steps (i) to (iii) with a thermosetting resin composition and a technique for thickening the thermosetting resin composition as needed after impregnation, a related art can be appropriately used.

1.1. Continuous Carbon Fiber Bundle In the SMC manufacturing method of the embodiment, a package of the continuous carbon fiber bundle prepared in advance is used. The continuous carbon fiber bundle has a filament number of NK and is partially split into n sub-bundles.

NK means N×1000. For example, a filament number of a carbon fiber bundle comprising 3,000 single filaments is 3K, and a filament number of a carbon fiber bundle comprising 12,000 single filaments is 12K.

N is usually 12 or more, preferably 15 or more, and can be, but not limited to 18, 24, 36, 48, or 50, for example.

The fact that a continuous carbon fiber bundle is partially split into n sub-bundles means that the continuous carbon fiber bundle is partially divided into n sub-bundle parts. Each of the n fiber bundles formed by dividing into n parts is called a sub-bundle. In the continuous carbon fiber bundle partially split into n sub-bundles, the n sub-bundles are joined to each other.

Figure 1:
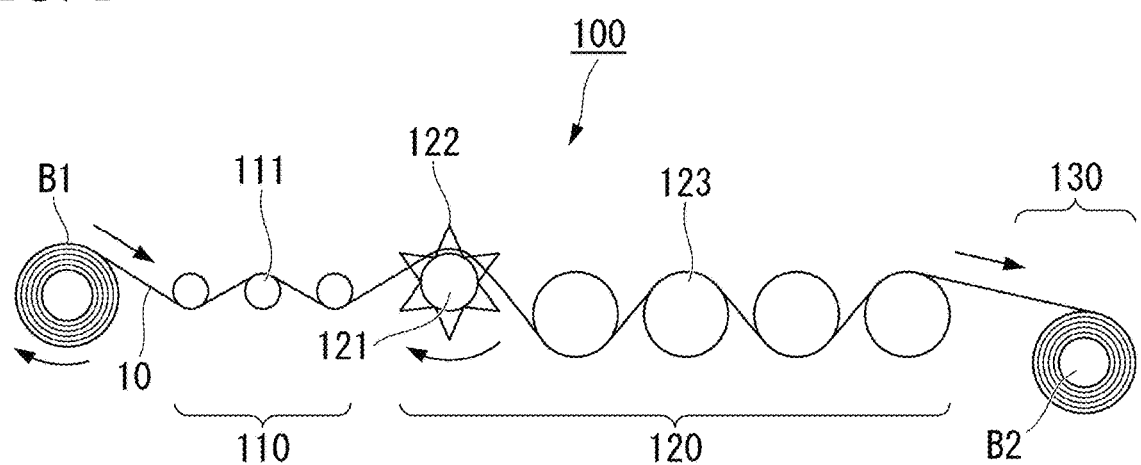
FIG. 1 is a schematic diagram of a fiber package manufacturing apparatus.

The package of the partially split continuous carbon fiber bundle can be manufactured using, but not limited to a fiber package manufacturing apparatus represented in a conceptual diagram in FIG. 1.

Referring to FIG. 1, a fiber package manufacturing apparatus 100 includes a spread section 110, a split section 120, and a winding section 130.

A continuous carbon fiber bundle 10 serving as a starting material and having a filament number of NK is drawn out from a supply bobbin B1.

The continuous carbon fiber bundle 10 drawn out from the supply bobbin B1 before being split is first spread in the spread section 110.

A spreader bar 111 provided in the spread section 110 may be heated and may be caused to reciprocate in a width direction of the continuous carbon fiber bundle 10. A mechanism therefor can refer to a known technique.

While the continuous carbon fiber bundle 10 originally has a flat shape, it is further increased in width and further decreased in thickness by being rubbed against the spreader bar 111. The thickness of the continuous carbon fiber bundle 10 after passing through the spread section 110 is not limited, but can typically be 0.05 to 0.2 mm.

The spread section 110 may be omitted, when the continuous carbon fiber bundle 10 is sufficiently flat at a stage when the continuous carbon fiber bundle 10 is supplied from the supply bobbin B1. For example, a carbon fiber bundle having a bundle width of 50 times or more of an average thickness can be said to be sufficiently flat.

Next, the continuous carbon fiber bundle 10 is fed to the split section 120 and is partially split there.

The split section 120 is provided with a rotary blade 121 for forming a slit in the continuous carbon fiber bundle 10 and a plurality of godet rolls 123 for controlling a traveling speed of the continuous carbon fiber bundle 10.

A rotation axis of the rotary blade 121 is parallel to a width direction of the continuous carbon fiber bundle 10 traveling along a fiber direction. A plurality of blade portions 122 are provided at a regular interval in a circumferential direction on an outer circumference of the rotary blade 121 so that slits having a constant length are intermittently formed at a regular interval along the fiber direction of the continuous carbon fiber bundle 10. A slit length and a gap length between the slits can be controlled by adjusting the traveling speed of the continuous carbon fiber bundle 10, a circumferential speed of the rotary blade 121, and an interval between the blade portions 122.

The continuous carbon fiber bundle 10 is partially divided into n parts due to intermittent formation of slits along the fiber direction by (n−1)-number of the rotary blades 121 aligned in the width direction.

The number n is not limited to, but preferably 3 or more and more preferably 5 or more and may be 10 or more.

Figure 2B:
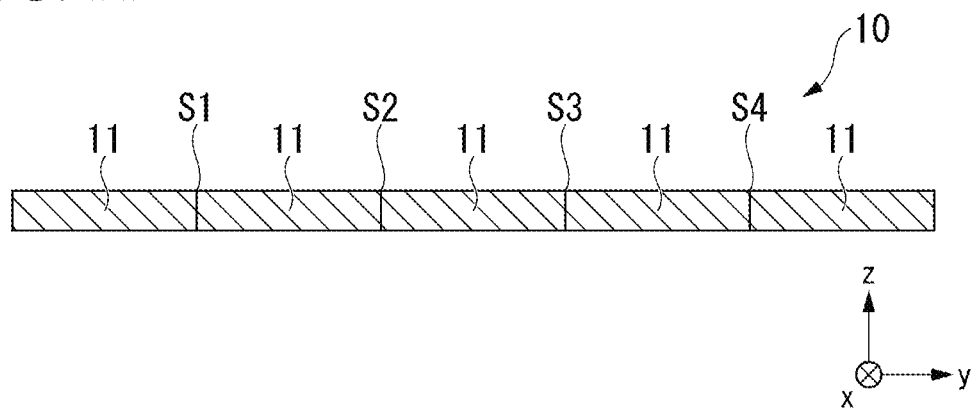
FIG. 2B is a schematic diagram representing the continuous carbon fiber bundle immediately after being partially split into five parts and is a sectional view representing a cross section perpendicular to a fiber direction.

As an example, FIGS. 2A and 2B represent the continuous carbon fiber bundle 10 immediately after the slits extending in the fiber direction are intermittently formed by four rotary blades 121 aligned in the width direction.

For convenience, when in the continuous carbon fiber bundle 10, the fiber direction (longitudinal direction) is defined as an x-direction, the width direction is defined as a y-direction and the thickness direction is defined as a z-direction, FIG. 2A is a plan view when the continuous carbon fiber bundle 10 is viewed from the z-direction and FIG. 2B represents a cross section (cross section when cut in an yz-plane) perpendicular to the x-direction of the continuous carbon fiber bundle 10.

As represented in FIG. 2A, in the continuous carbon fiber bundle 10, four slit rows including a first slit row $A_{S1}$, a second slit row $A_{S2}$, a third slit row $A_{S3}$, and a fourth slit row $A_{S4}$ are formed.

The first slit row $A_{S1}$ comprises a plurality of first slits S1 aligned in the x-direction.

The second slit row $A_{S2}$ comprises a plurality of second slits S2 aligned in the x-direction.

The third slit row $A_{S3}$ comprises a plurality of third slits S3 aligned in the x-direction.

The fourth slit row $A_{S4}$ comprises a plurality of fourth slits S4 aligned in the x-direction.

The four slit rows are formed by different rotary blades and therefore are different from each other in positions in the y-direction.

A slit length $L_S$ and an inter-slit gap length $L_G$ are constant in any of the slit rows, and are common also among different slit rows.

A ratio $L_S/(L_S+L_G)$ of the slit length $L_S$ to a sum of the slit length $L_S$ and the inter-slit gap length $L_G$ is usually 90% or higher and preferably 95% or higher and may be 99% for example. Therefore, as represented in FIG. 2B, the continuous carbon fiber bundle 10 is split into five sub-bundles 11 in most parts.

The positions of the first slit row $A_{S1}$, the second slit row $A_{S2}$, the third slit row $A_{S3}$, and the fourth slit row $A_{S4}$ in the y-direction are set so that the widths of the five sub-bundles 11 are approximately the same. For example, when the filament number of the continuous carbon fiber bundle 10 is 15K, the filament number of each of the sub-bundles 11 is 3K±0.5K.

The slit length $L_S$ is not limited to, but preferably longer than 25 mm, more preferably longer than 50 mm, and much more preferably longer than 500 mm. The reason is that an interval when the continuous carbon fiber bundle 10 is cut in the subsequent step is usually 25 mm or larger. As a ratio of the slit length $L_S$ to a cutting interval when the continuous carbon fiber bundle 10 is cut into the chopped carbon fiber bundles is higher, the chopped carbon fiber bundles having a filament number equal to or less than that of the sub-bundle 11 are produced more.

For example, the slit length $L_S$ can be longer than 25 mm and 50 mm or shorter, longer than 50 mm and 100 mm or shorter, longer than 100 mm and 200 mm or shorter, longer than 200 mm and 500 mm or shorter, longer than 500 mm and 1000 mm or shorter, longer than 1000 mm and 1500 mm or shorter, longer than 1500 mm and 2000 mm or shorter, and longer than 2000 mm and 3000 mm or shorter.

The inter-slit gap length $L_G$ is not limited to, but for example 5 to 10 mm and may be shorter than 5 mm.

In an example represented in FIG. 2A, positions of inter-slit gaps $G_S$ are shifted in the x-direction between the first slit row $A_{S1}$ and the second slit row $A_{S2}$. The same applies to between the second slit row $A_{S2}$ and the third slit row $A_{S3}$, and between the third slit row $A_{S3}$ and the fourth slit row $A_{S3}$.

Figure 15:
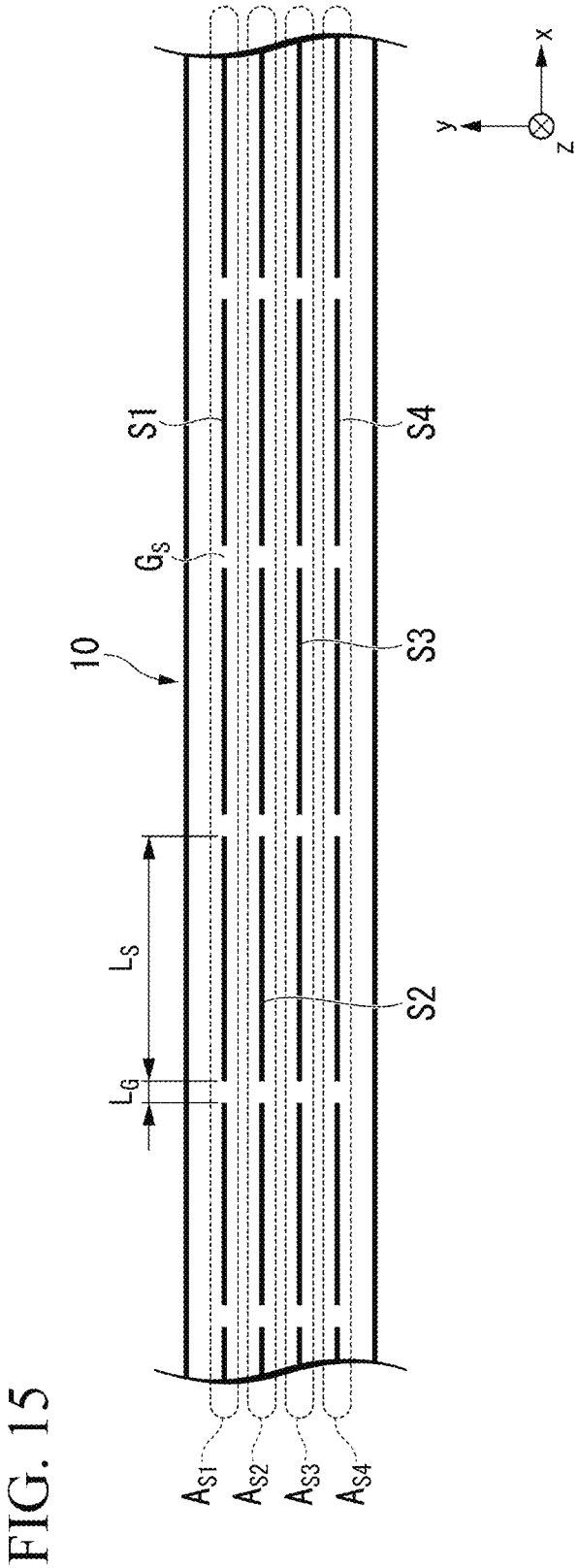
FIG. 15 is a plan view representing a continuous carbon fiber bundle immediately after being partially split into five parts.

Such a configuration with a shifting in the positions of the inter-slit gaps $G_S$ in the x-direction between the adjacent slit rows is not essential. In one example, the positions of the inter-slit gaps $G_S$ may be aligned among all of the slit rows as represented in FIG. 15. In another example, the positions of the inter-slit gaps $G_S$ may be aligned among some of the slit rows and shifted in the x-direction among some other slit rows.

The slit length $L_S$, the inter-slit gap length $L_G$, a ratio $L_S/(L_S+L_G)$ of the slit length $L_S$ to a sum of the slit length $L_S$ and the inter-slit gap length $L_G$, and the position of the inter-slit gap $G_S$ as described above are not limited to a case where the continuous carbon fiber bundle 10 is partially split into the five sub-bundles, and the same applies to a case where the continuous carbon fiber bundle 10 is partially split into four sub-bundles or less or six sub-bundles or more.

Regardless of the number n, the filament number of the sub-bundle formed by splitting the continuous carbon fiber bundle 10 is preferably 5K or less, more preferably 4K or less, and much more preferably 3K or less. Regardless of the number n, the filament number of the sub-bundle formed by splitting the continuous carbon fiber bundle 10 is preferably more than 0.5K and more preferably 1K or more. When the filament number is more than 0.5K, straightness of the carbon fiber bundle is likely to be maintained, and a reinforcing effect tends to be relatively high.

The abovementioned upper limits and lower limits can be arbitrarily combined. For example, regardless of the number n, the filament number of the sub-bundle formed by splitting the continuous carbon fiber bundle 10 is preferably 0.5K to 5K, more preferably 0.5K to 4K and much more preferably 1K to 3K.

Referring to FIG. 1 again, the continuous carbon fiber bundle 10 partially split into n parts in the split section 120 is fed to the winding section 130, and is wound on a winding bobbin B2, thereby completing the package.

For example, the winding bobbin B2 is a paper tube, but is not limited thereto. When the package is used, the winding bobbin B2 can be pulled out, and the continuous carbon fiber bundle can be unwound by internal unwinding.

The continuous carbon fiber bundle 10 is wound so that there is no gap between the sub-bundles 11. The reason is to prevent the sub-bundles 11 from biting each other between a portion previously wound on the bobbin B2 and a portion wound later so as to overlap the previously wound portion. By winding so that there is no gap between the sub-bundles 11, the continuous carbon fiber bundle 10 can be prevented from being entangled or cut of a sub-bundle during unwinding by external unwinding or internal unwinding.

Figure 3:
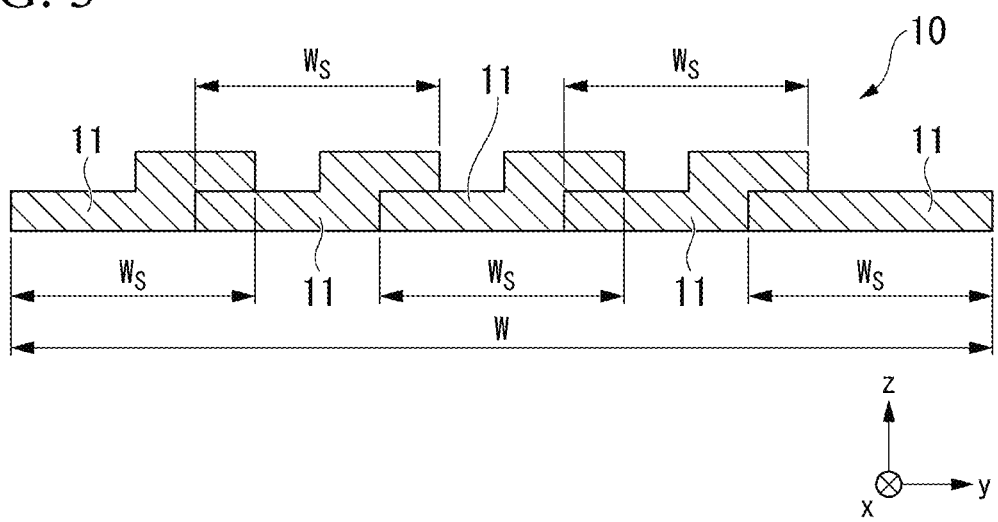
FIG. 3 is a schematic diagram representing a cross section perpendicular to the fiber direction of a continuous carbon fiber bundle wound on a bobbin after being partially split into five parts.

In order to wind the continuous carbon fiber bundle 10 on the bobbin so that there is no gap between the sub-bundles 11, a total width W of the continuous carbon fiber bundle 10 may be made narrower than a sum of sub-bundle widths $W_s$ as represented in FIG. 3.

FIG. 3 is a sectional view when the continuous carbon fiber bundle 10 is cut perpendicular to the fiber direction, showing that the five sub-bundles 11 are aligned without any gap in the y-direction. That is, there is no part where the adjacent sub-bundles 11 are away from each other, and each of the sub-bundles 11 overlaps the immediately adjacent sub-bundle 11 at an edge portion.

The width of the carbon fiber bundle can be reduced by guiding the carbon fiber bundle with a guide having a width narrower than that of the carbon fiber bundle. Therefore, in order to wind the continuous carbon fiber bundle 10 on the bobbin B2 in a state where the total width W is narrowed than a total sum of the sub-bundle widths $W_s$, for example, a grooved roll having a groove width narrower than the total sum of the sub-bundle widths may be used in guiding the continuous carbon fiber bundle after being partially split to the winding bobbin. Alternatively, the width of a fiber bundle guide of a traverse device may be narrowed than the total sum of the sub-bundle widths.

When the total width of the continuous carbon fiber bundle is narrowed by the above-described method, not only the sub-bundles may overlap each other, but also some sub-bundles may be folded in the width direction. Therefore, a manner of overlapping of the sub-bundles in the continuous carbon fiber bundle wound on the winding bobbin is not limited to the manner represented in FIG. 3 and can be various.

In order to ensure that there is no gap between the sub-bundles, the total width of the continuous carbon fiber bundles 10 when wound on the winding bobbin is preferably 90% or less, more preferably 86% or less and much more preferably 80% or less of the total sum of the widths of the sub-bundles.

The total width of the continuous carbon fiber bundle when wound on the winding bobbin is preferably, but without limitation, not narrowed until the total width is equal to the width of the sub-bundle. In particular, in a case where the number n of sub-bundles is large, when the total width is excessively small, winding collapse is likely to occur.

A traverse device (not represented) is usually installed in the winding section 130.

When the continuous carbon fiber bundle 10 is traverse-wound on the winding bobbin B2, although not limiting, a lead angle at a start of winding can be set to, for example, 5° to 30° and the lead angle at an end of winding can be set to, for example, 2° to 17°.

Figure 16:
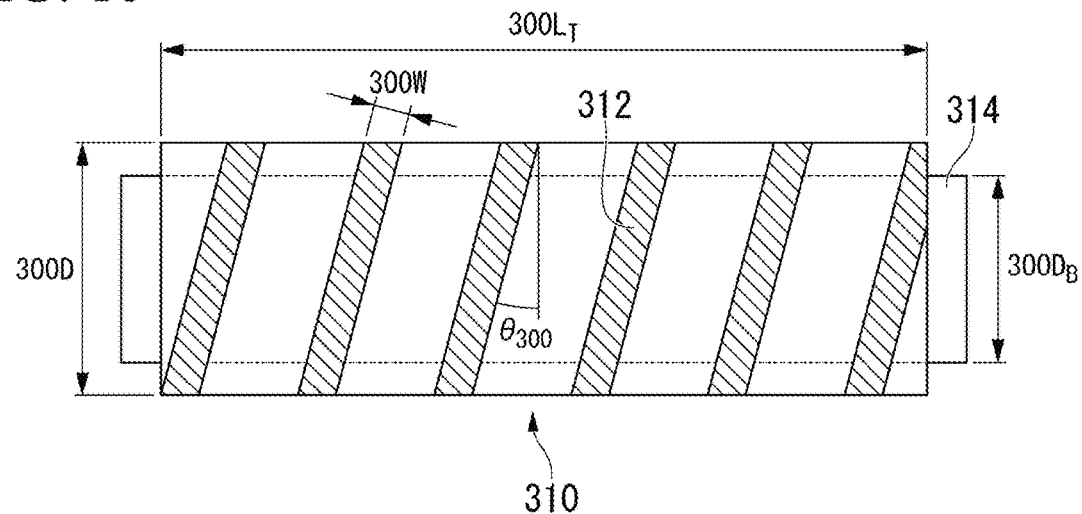
FIG. 16 is a schematic diagram of a square end type fiber package in which a fiber bundle is traverse-wound on a bobbin when viewed from a direction perpendicular to a rotation axis of the bobbin.

A winding ratio represents rotation times of the bobbin during one round trip of a traverse guide, and in other words, the winding ratio may be paraphrased as the number of turns per one traverse cycle. In a case where a square end type fiber package illustrated in FIG. 16 is manufactured by winding a yarn around a bobbin with a constant winding ratio, when the winding ratio is an integer, the yarn is wound at the same position of the bobbin in all traverse cycles, thereby causing so-called ribbon winding and a possible poor unwinding property.

When a fraction of the winding ratio after a decimal point is a multiple of 1/p (p is an integer of 2 or more), the yarn is wound at the same position of the bobbin every p-traverse cycle, thereby causing a possible poor unwinding property particularly when p is small, as in a case where the winding ratio is an integer.

Therefore, when the continuous carbon fiber bundle 10 is wound on the winding bobbin B2, the winding ratio is usually not an integer, and further it is preferable that the fraction of the winding ratio after the decimal point is a multiple of none of ½, ⅓, ¼ and ⅕.

1.2. SMC Manufacturing Apparatus

Figure 4:
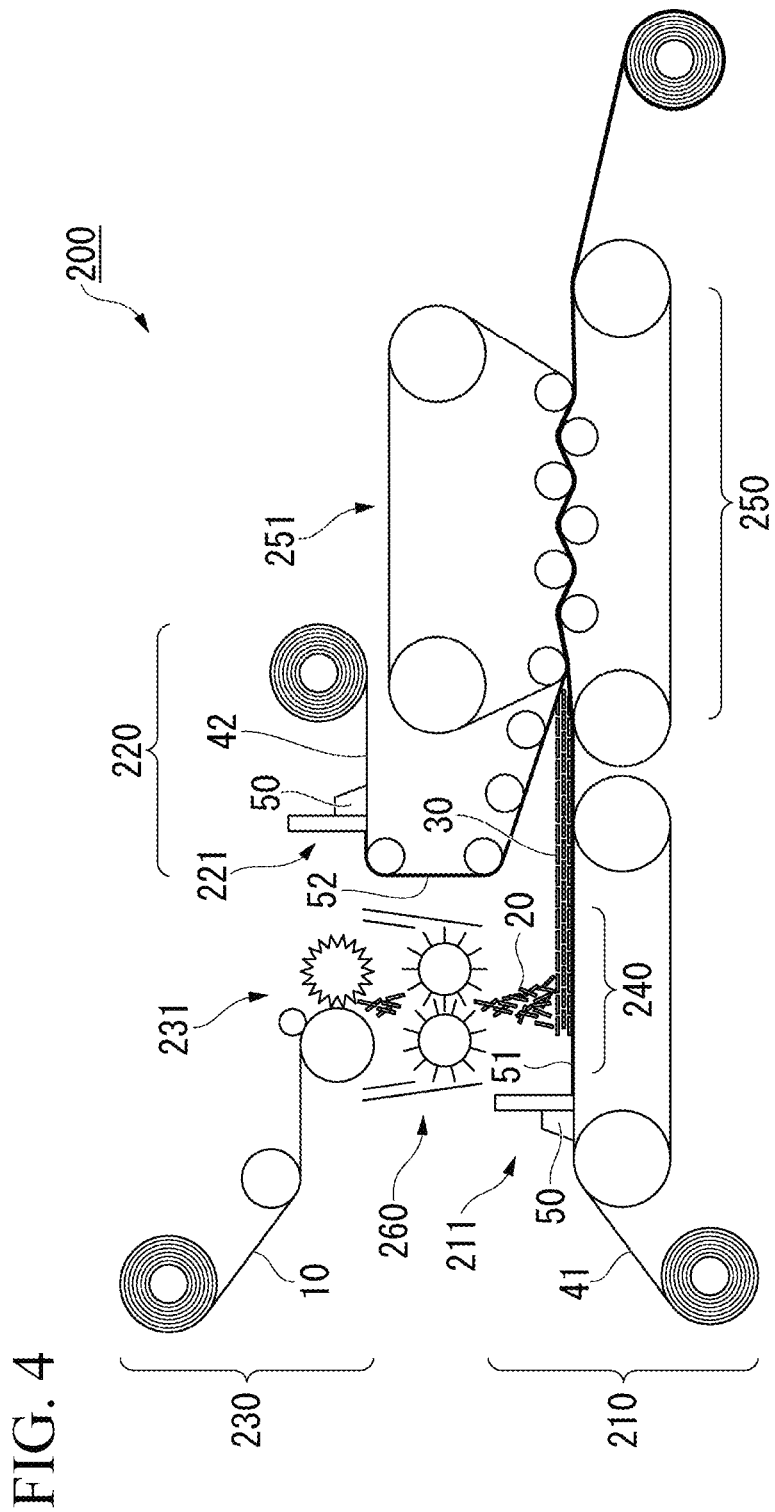
FIG. 4 is a schematic diagram of an SMC manufacturing apparatus.

FIG. 4 represents a conceptual diagram of an SMC manufacturing apparatus that can be preferably used in an SMC manufacturing method of the embodiment.

Referring to FIG. 4, an SMC manufacturing apparatus 200 includes a first resin application section 210, a second resin application section 220, a chopping section 230, a deposition section 240, and an impregnation section 250. A fragmentation processing apparatus 260 is disposed between the chopping section 230 and the deposition section 240.

The first resin application section 210 is provided with a first applicator 211 including a doctor blade to form a first resin layer 51 comprising a thermosetting resin composition 50 on a first carrier film 41 drawn out from a roll.

The second resin application section 220 is provided with a second applicator 212 including a doctor blade to form a second resin layer 52 comprising the same thermosetting resin composition 50 on a second carrier film 42 drawn out from a roll.

The chopping section 230 is provided with a rotary cutter 231 for chopping a continuous carbon fiber bundle 10 drawn out from a package (the bobbin may be removed).

Figure 5:
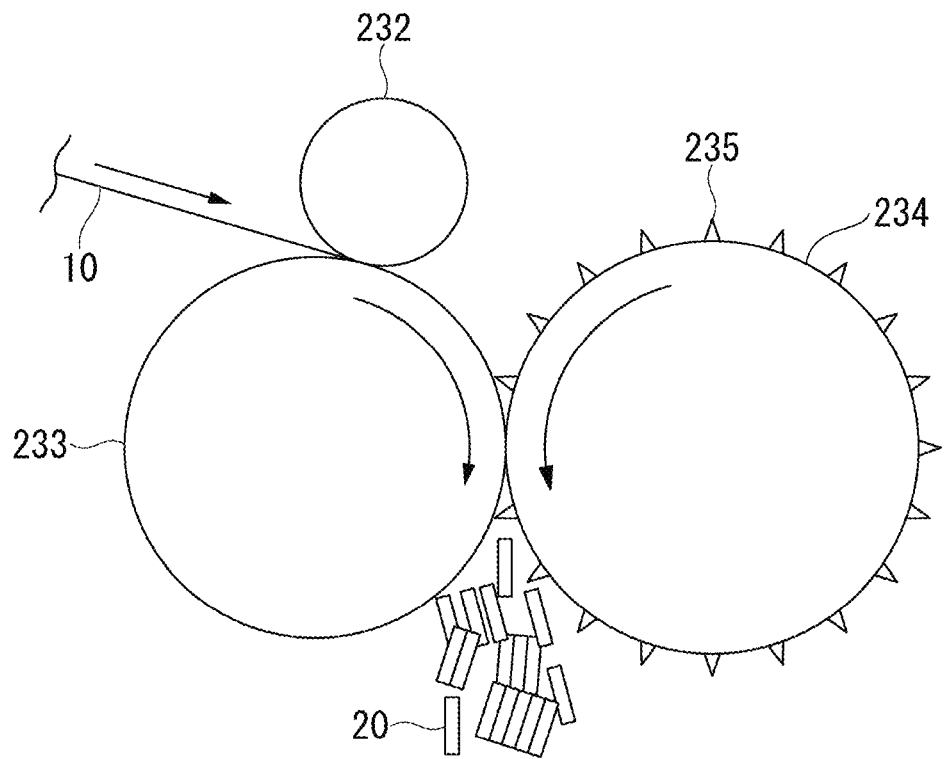
FIG. 5 is a schematic diagram of a rotary cutter.

As represented in FIG. 5, the rotary cutter 231 includes a guide roll 232, a pinch roll 233, and a cutter roll 234. A plurality of blades 235 are disposed on an outer circumference of the cutter roll 234 at a regular interval in a circumferential direction, and chopped carbon fiber bundles 20 having a constant fiber length can be cut out one after another from the continuous carbon fiber bundle 10.

Usually, a plurality of the continuous carbon fiber bundles 10 are aligned to be parallel to each other in a plane parallel to a rotation axis direction of the rotary cutter 231 and are supplied to the rotary cutter 231 at the same time.

The rotation axis direction of the rotary cutter 231 is a direction of a rotation axis of a main component of the rotary cutter 231 such as the cutter roll 234. The direction of the rotation axis of the guide roll 232 and the pinch roll 233 is the same as the direction of the rotation axis of the cutter roll 234.

The deposition section 240 is disposed below the chopping section 230. The first carrier film 41 is conveyed from the first resin application section 210 to the impregnation section 250 via the deposition section 240. When the first carrier film 41 travels in the deposition section 240, the chopped carbon fiber bundles 20 produced in the chopping section 230 are fallen and deposited on the first resin layer 51 formed on a surface of the first carrier film 41, so that a carbon fiber mat 30 is formed.

A mechanism for gradually bringing the first carrier film 41 and the second carrier film 42 closer to each other is disposed in an upstream part of the impregnation section 250. An impregnation machine 251 is disposed in a main part of the impregnation section 250. In order that a laminate in which the carbon fiber mat 30 and the thermosetting resin composition 50 are sandwiched between the first carrier film 41 and the second carrier film 42 is conveyed by being sandwiched from above and below with two conveyor belts, the impregnation machine 251 includes two belt conveyors located above and below, and includes rollers for pressurizing the laminate by sandwiching it together with the conveyor belts.

Figure 6:
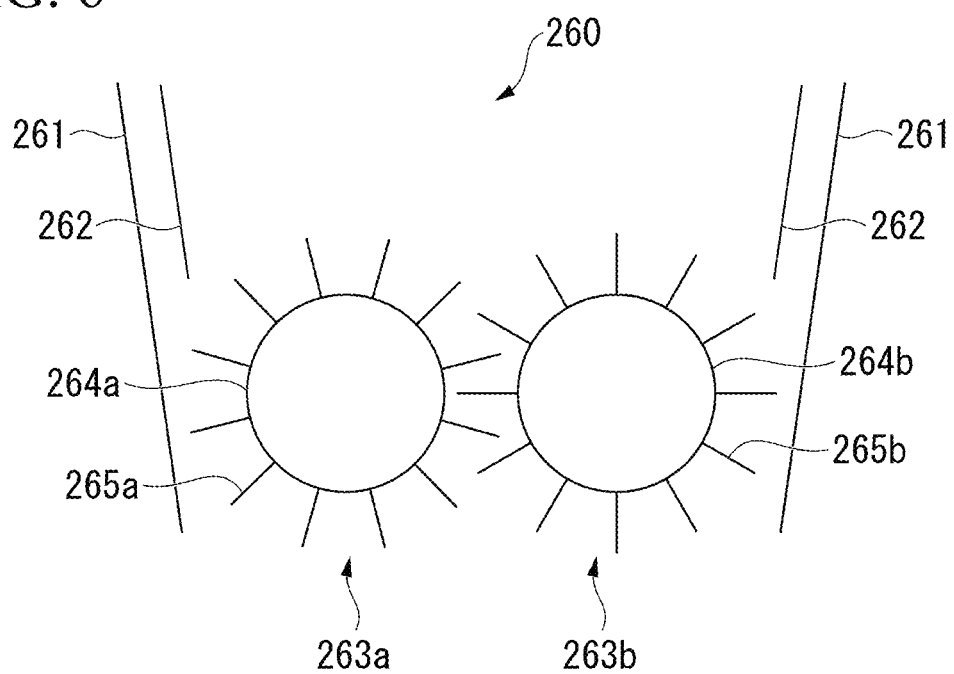
FIG. 6 is a schematic diagram of a fragmentation processing apparatus.

As represented in FIG. 6, the fragmentation processing apparatus 260 disposed between the chopping section 230 and the deposition section 240 includes a cover 261, and guide plates 262 and a pair of pin rollers (first pin roller 263a and second pin roller 263b) which are disposed inside the cover. The first pin roller 263a and the second pin roller 263b are located below the guide plates, have substantially the same axial length, and have the rotation axes parallel to each other.

In the SMC manufacturing apparatus 200, the fragmentation processing apparatus 260 is disposed so that the rotation axes of the first pin roller 263a and the second pin roller 263b are parallel to the rotation axis direction of the rotary cutter 231.

Figure 7:
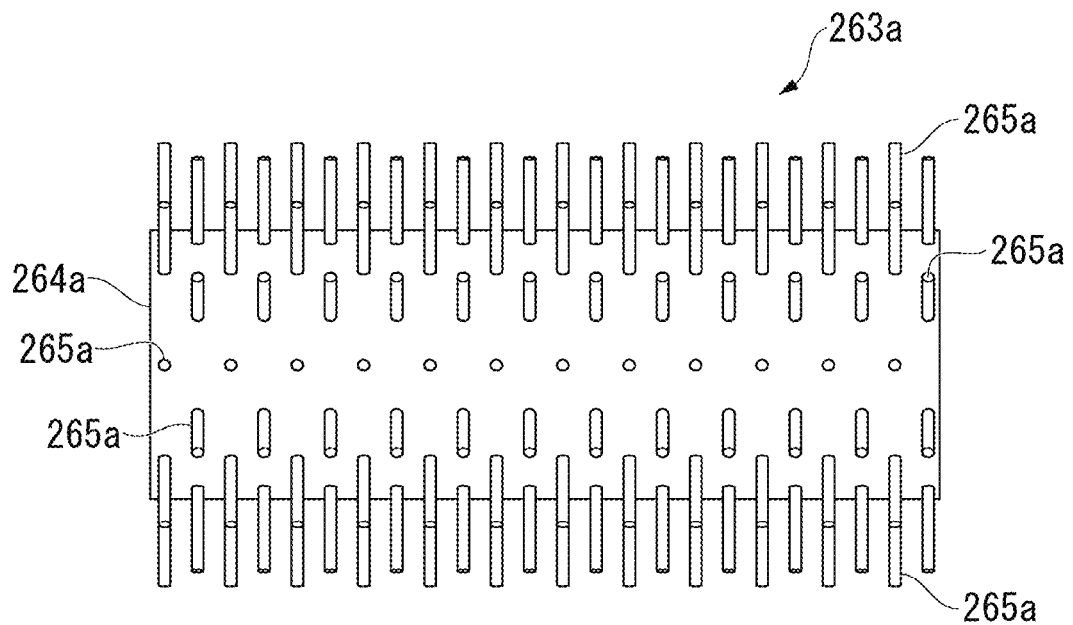
FIG. 7 is a schematic diagram of a pin roll provided in the fragmentation processing apparatus.

Referring to FIG. 7, the first pin roller 263a has a cylinder 264a, and a plurality of pins 265a having the same shape and the same dimension are disposed on the surface thereof. Both the cylinder 264a and the pin 265a are rigid bodies, and are formed of metal, for example.

A diameter of the cylinder 264a is not limited, but can be 60 mm to 150 mm, for example.

The pin 265a extends to be perpendicular to the rotation axis of the first pin roller 263a. Although not limited, the pin 265a has a columnar shape, for example. A boundary between an end surface and an outer circumferential surface may be chamfered in the pin 265a.

The diameter of the pin 265a is not limited, but can be, for example, 1 mm to 5 mm.

The length of the pin 265a, that is, the distance from the tip to the root of the pin is not limited, but can be 10 mm to 50 mm, for example.

It is preferable that the pin 265a has a circular cross section to prevent fluffing of the chopped carbon fiber bundle 20 processed by the fragmentation processing apparatus 260. The pin 265a may have a shape of a cone or a truncated cone whose diameter decreases toward the tip.

When a circumferential surface of the cylinder 264a is plane-developed, it is preferable that disposition of the pins 265a on the circumferential surface overlaps original disposition when shifted by 5 mm to 20 mm in the axial direction and 4 mm to 30 mm in the circumferential direction.

Figure 8:
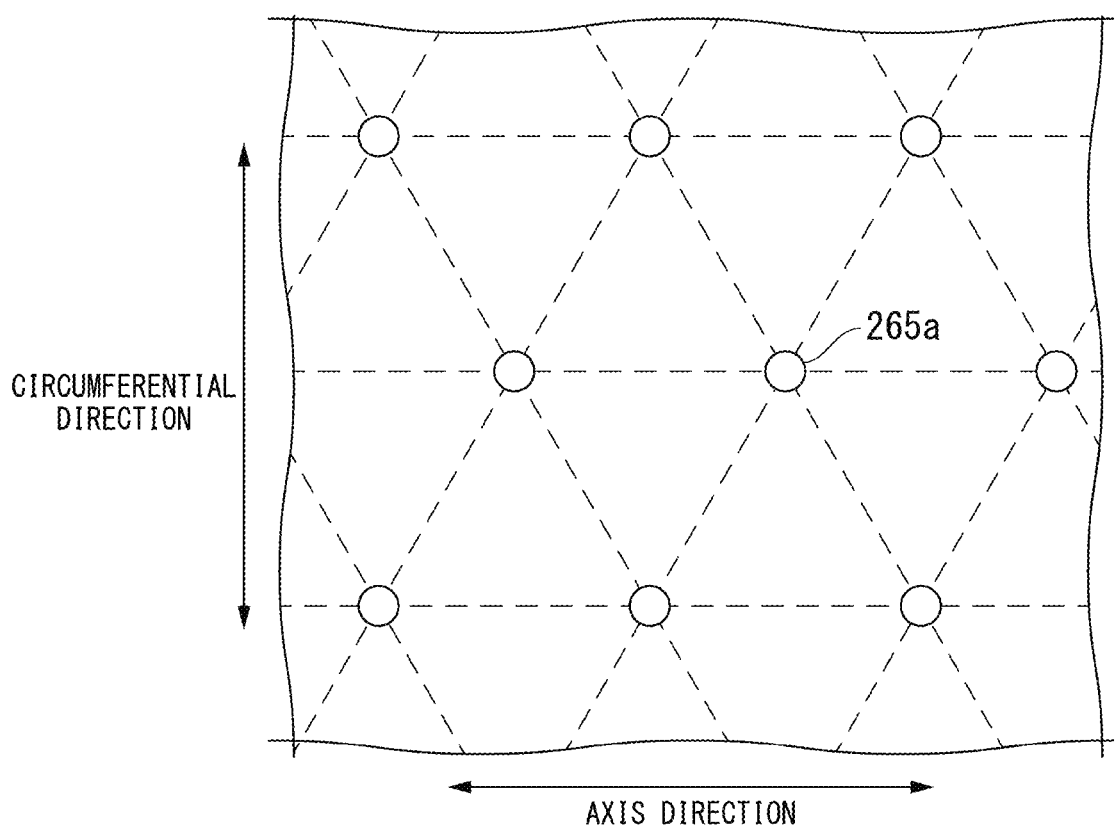
FIG. 8 represents a portion of a plane-development of a circumferential surface of a pin roll.

For example, in a case of the cylinder 264a represented in FIG. 7, when the circumferential surface is plane-developed, the pin 265a is disposed at each vertex of equilateral triangles (indicated by a broken line) tessellating so that one side is parallel to the axial direction, as represented in FIG. 8. For example, when the length of one side of the equilateral triangle is 5 mm, the disposition of the pin 265a represented in FIG. 8 overlaps the original disposition when shifted by 2.5 mm in the axial direction and approximately 4.3 mm in the circumferential direction.

All with regard to the first pin roller 263a described above are also applied to the second pin roller 263b.

Although not limited, in order to reduce costs for designing, manufacturing, and maintaining the fragmentation processing apparatus 260, it is preferable that in items as many as possible, including a maximum radius, a cylinder diameter and a shape, a dimension, a number and a disposition of a pin, designs and specifications of the first pin roller 263a and the second pin roller 263b coincide with each other.

In this specification, the maximum radius of the pin roller is defined as a distance from the rotation axis to the tip of the pin.

Figure 9:
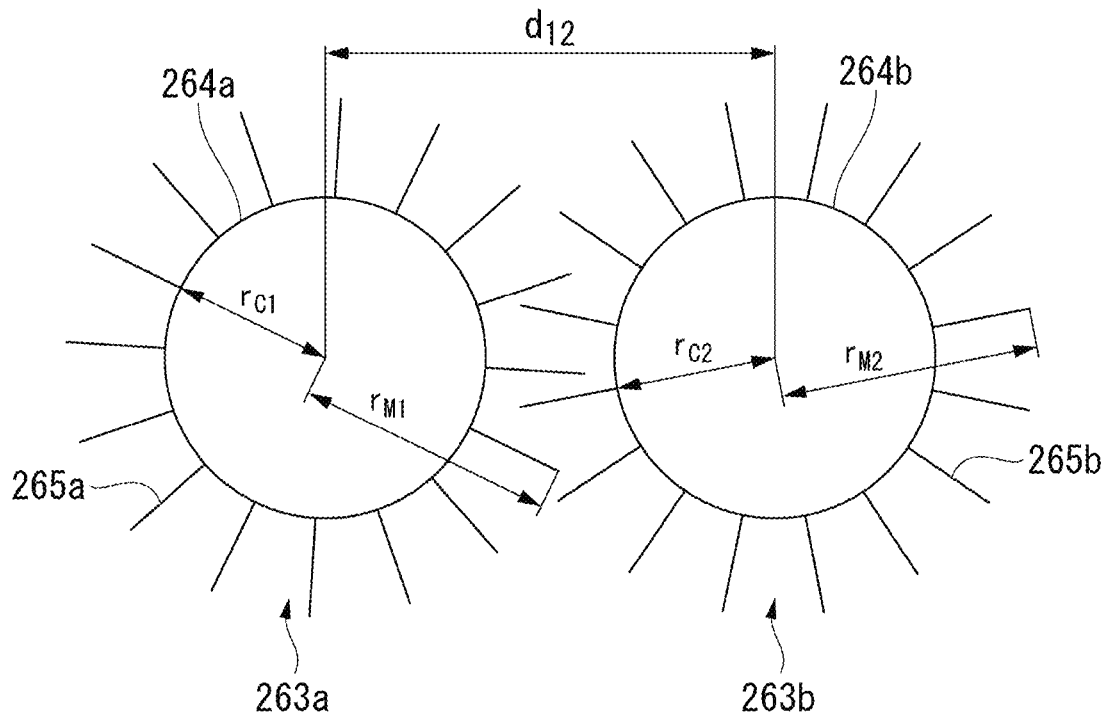
FIG. 9 is a schematic diagram representing a positional relationship and the like between two pin rolls provided in a fragmentation processing apparatus.

Referring to FIG. 9, in the fragmentation processing apparatus 260, the sum of a maximum radius $r_{M1}$ of the first pin roller 263a and a maximum radius $r_{M2}$ of the second pin roller 263b is larger than a distance d12 between the rotation axes of the two pin rollers.

The sum of the maximum radius $r_{M1}$ of the first pin roller 263a and a radius $r_{C2}$ of the cylinder 264b of the second pin roller is smaller than the distance d12 between the rotation axes of the two pin rollers. Similarly, the sum of the maximum radius $r_{M2}$ of the second pin roller 263b and a radius $r_{C1}$ of the cylinder 264a of the first pin roller is also smaller than the distance $d_{12}$ between the rotation axes of the two pin rollers.

The first pin roller 263a and the second pin roller 263b are rotationally driven by a drive mechanism (not represented).

There is no limitation on the rotation directions of the first pin roller 263a and the second pin roller 263b. Therefore, the rotation direction of the first pin roller 264a and the rotation direction of the second pin roller 263b may be the same or opposite.

When the first pin roller 264a and the second pin roller 263b rotate in mutually opposite directions, the rotation mode may be inward rotation or outward rotation. The inward rotation means a mode in which the pin rollers each rotate so that the pin moves downward from above on a side facing the other pin roller. On the other hand, the outward rotation means a mode in which the pin rollers each rotate so that the pin moves upward from below on a side facing the other pin roller.

In another embodiment, the number of pin rollers provided in the fragmentation processing apparatus may be one, or may be three or more.

The fragmentation processing apparatus is not limited to those which include the pin roller as a rotating body.

Figure 17:
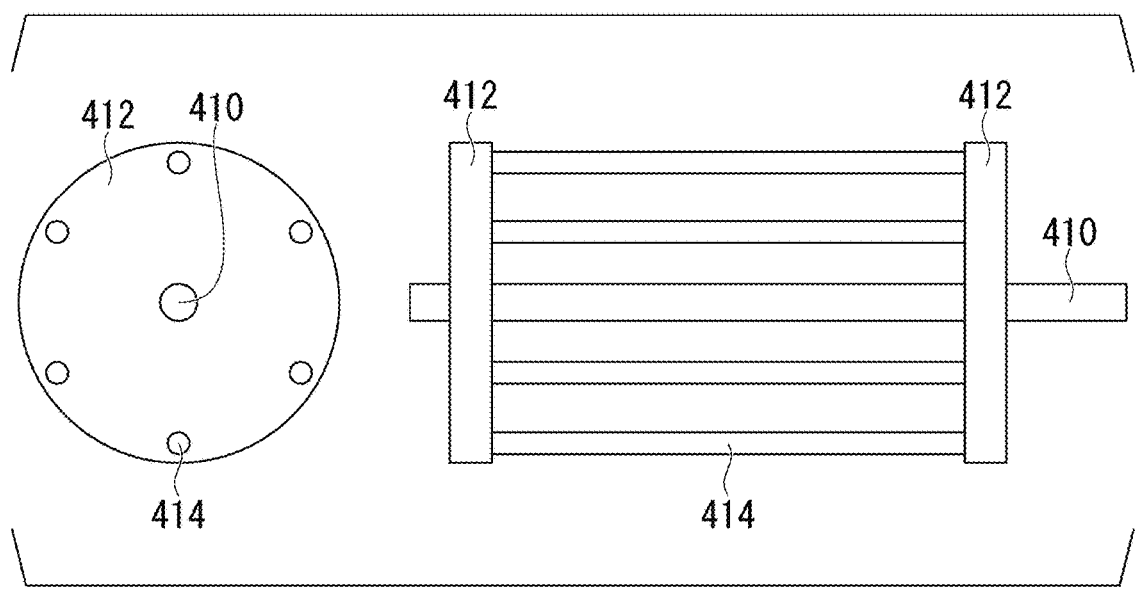
FIG. 17 is a schematic diagram representing an example of a rotating body of a fragmentation processing apparatus.

For example, the rotating body in the fragmentation processing apparatus may have a structure in which a pair of disks are connected by a plurality of wires or rods as represented in FIG. 17.

1.3. SMC Manufacturing Method

An SMC manufacturing method of the embodiment will be described using, as an example, a case in which the SMC manufacturing apparatus 200 described in 1.2 above is used.

(Drawing Out Step)

In a drawing out step, a continuous carbon fiber bundle is drawn out from a package of the continuous carbon fiber bundle prepared in advance. The continuous carbon fiber bundle has a filament number of NK and is partially split into n sub-bundles in advance.

In this step, the continuous carbon fiber bundle may be drawn out by external unwinding from a bobbin package placed on a creel, or the continuous carbon fiber bundle may be drawn out by internal unwinding from a package from which a bobbin is removed.

As described above, when the package is manufactured, the continuous carbon fiber bundle is wound on the bobbin in a state where the adjacent sub-bundles overlap each other. Therefore, the continuous carbon fiber bundle drawn out from the package includes a portion in which the sub-bundles are partially overlapped and sticked to each other.

(Chopping Step)

In a chopping step, the drawn out continuous carbon fiber bundle 10 is supplied to the chopping section 230 and cut one after another by the rotary cutter 231, thereby producing the chopped carbon fiber bundles 20 having a predetermined fiber length. The produced chopped carbon fiber bundles 20 fall toward the fragmentation processing apparatus 260 placed below the rotary cutter 231.

The fiber length of the chopped carbon fiber bundle 20 is not limited, but can be preferably 20 to 60 mm, and can be approximately 25 mm or approximately 50 mm, for example.

(Fragmentation Processing Step)

As described above, the continuous carbon fiber bundle drawn out from the package includes a portion in which the sub-bundles are partially overlapped and sticked to each other. The chopped carbon fiber bundles produced in the chopping step include to some extent a fiber bundle having a filament number of more than $\{(N/n)+0.5\}K$, which is generated by cutting the above-described portion. The fragmentation processing step aims to improve a distribution of the filament number of the chopped carbon fiber bundles in the carbon fiber mat formed in a deposition step (to be described later) by fragmentation of such fiber bundle with the fragmentation processing apparatus.

In the fragmentation processing apparatus 260, at least some of the chopped carbon fiber bundles 20 falling from the rotary cutter 231 come into contact with at least one of the first pin roller 263a and the second pin roller 263b and are divided into a plurality of fragments by an impact.

The fragmentation processing is not intended for defibration. That is, the fragmentation processing is not to loosen the chopped carbon fiber bundle into single fibers or a state close to single fibers. In a preferred example, a circumferential speed at a tip of the pin of each of the first pin roller 263a and the second pin roller 263b is set so that the fragmentation processing does not generate a fiber bundle having a filament number of 0.5K or less and a single fiber, or even when generated, so that a content thereof in the carbon fiber deposited on the first carrier film 41 is lower than 1% by weight.

(Resin Application Step)

In a resin application step, the first resin layer 51 comprising the thermosetting resin composition 50 is formed on the first carrier film 41 drawn out from a roll using the first applicator 211, and the second resin layer 52 comprising the same thermosetting resin composition 50 is formed on the second carrier film 42 drawn out from another roll using the second applicator 212.

The thermosetting resin composition 50 is a fluid paste containing a thermosetting resin as a main component and in which a thickener and a curing agent are blended, and if necessary, additives such as a low shrinkage agent, a filler, and a flame retardant are blended.

Typical examples of the thermosetting resin are an epoxy resin, a vinyl ester resin, an unsaturated polyester resin, a polyimide resin, a maleimide resin and a phenol resin, and two or more types selected from these resins can be mixed and used.

Preferred thermosetting resins are the epoxy resin, the vinyl ester resin, and the unsaturated polyester resin in view of excellent adhesiveness to the carbon fiber.

With regard to a specific formulation of the thermosetting resin composition, a related art can be appropriately used.

(Deposition Step)

In a deposition step, the chopped carbon fiber bundles 20 processed by the fragmentation processing apparatus 260 fall on the first carrier film 41 conveyed below the fragmentation processing apparatus 260. The fallen chopped carbon fiber bundles 20 are deposited on the first resin layer 51 formed on a surface of the first carrier film 41, thereby forming the carbon fiber mat 30.

(Impregnation Step)

On the way to the impregnation machine 251, the first carrier film 41 loaded with the carbon fiber mat 30 deposited on the first resin layer 51 is laminated with the second carrier film 42 with a side having the second resin layer 52 formed thereon facing downward.

The carbon fiber mat 30 is impregnated with the thermosetting resin composition 50 by pressurizing the laminate formed by the lamination with the impregnation machine 251.

After the impregnation step is completed, the impregnated carbon fiber mat 30 is wound on a bobbin while sandwiched between the first carrier film 41 and the second carrier film 42 and becomes an SMC product through an aging step. In the aging step, the thermosetting resin composition 50 becomes highly viscous by an action of the added thickener and is brought into a semi-cured state.

2. Experimental Results

Hereinafter, results of experiments performed by the present inventors will be described.

2.1. Experiment 1

(Preparation of a Partially Split Continuous Carbon Fiber Bundle)

As a starting material, a flat continuous carbon fiber bundle (TR50S15L manufactured by Mitsubishi Chemical Corporation) having a filament number of 15K, an initial width of 8 mm and a thickness of 0.1 mm was prepared. By forming four slit rows each having a slit length of 1,000 mm and an inter-slit gap length of 5 mm using a splitter having four rotary blades, the continuous carbon fiber bundle was partially split into five sub-bundles each having a width of 1.6 mm. Positions of inter-slit gaps along the fiber direction were the same among all of the slit rows.

After partial splitting, by winding the continuous carbon fiber bundle on a paper bobbin having a diameter of 82 mm and a length of 280 mm with a traverse length of 254 mm, a square end type package was prepared. By adjusting the width of a guide for guiding the fiber bundle, the total width of the continuous carbon fiber bundle during winding was made to be 6 mm or less.

(Preparation of Carbon Fiber Mat)

A carbon fiber mat was prepared from the continuous carbon fiber bundle having a filament number of 15K and partially split into five sub-bundles prepared in the above-described procedure using an SMC manufacturing apparatus having the same configuration as the SMC manufacturing apparatus represented in FIG. 4 except that the fragmentation processing apparatus is not provided.

A plurality of the continuous carbon fiber bundles were simultaneously supplied to a rotary cutter in a state of being aligned in parallel at an equal interval and were cut every 25.4 mm.

The chopped carbon fiber bundles were fallen onto a carrier film which travels below the rotary cutter at a line speed of 5 m/min and was not coated with a thermosetting resin composition. The fallen chopped carbon fiber bundles were deposited on the carrier film to form a carbon fiber mat.

(Measurement of Distribution of Filament Number)

Figure 10:
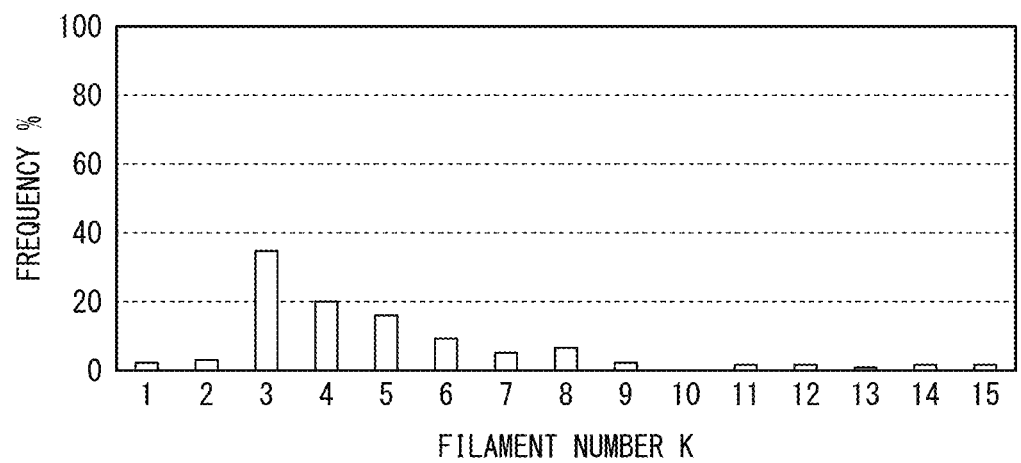
FIG. 10 is a histogram representing a distribution of filament number of chopped carbon fiber bundles in a carbon fiber mat.

A region of approximately 21 cm×30 cm deposited near a center line of the carrier film was selected from the carbon fiber mat prepared through the above-described procedure, and a weight of all of the chopped carbon fiber bundles (300 pieces or more) included in the region was measured. FIG. 10 represents a distribution of the filament number the chopped carbon fiber bundles in the carbon fiber mat, which was obtained by converting the measured weight into a filament number.

In the prepared carbon fiber mat, a content of the carbon fiber bundle having the filament number of more than 0.5K was 99.9% by weight or more.

2.2. Experiment 2

The carbon fiber mat was prepared using the same SMC manufacturing apparatus used in Experiment 1 except that the fragmentation processing apparatus was provided, and the distribution of the filament number thereof was measured in the same manner as in Experiment 1. The procedure for preparing the carbon fiber mat was the same as that in Experiment 1 except that the chopped carbon fiber bundles were subjected to a fragmentation processing by the fragmentation processing apparatus before being deposited on the carrier film.

A configuration of the fragmentation processing apparatus was the same as that included in the SMC manufacturing apparatus represented in FIG. 4. Both the two pin rollers were formed of metal and had the same configuration. A diameter and a length of a pin disposed on a cylinder circumferential surface of each pin roller were respectively 3 mm and 20 mm.

When the cylinder circumferential surface of each pin roller was plane-developed, disposition of the pins on the circumferential surface was periodic, and the disposition overlapped the original disposition when shifted by 7.5 mm in the axial direction and 6.5 mm in the circumferential direction.

In Experiment 2, the two pin rollers were each rotated so that the circumferential speed at the tip of the pin was 377 m/min.

The two pin rollers were rotated in opposite directions in an inward rotation mode. In other words, the pin rollers were each rotated so that the pin moves downward from above on a side facing the other pin roller.

Figure 11:
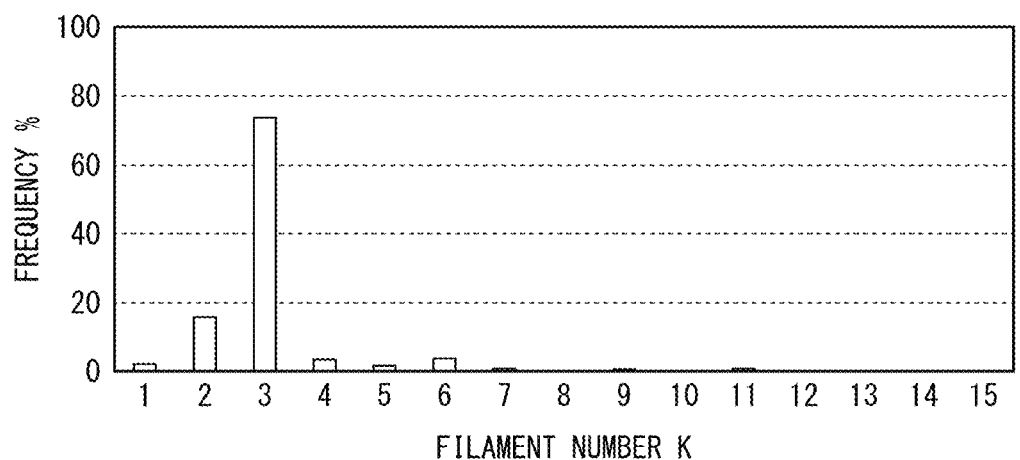
FIG. 11 is a histogram representing a distribution of filament number of chopped carbon fiber bundles in a carbon fiber mat.

FIG. 11 represents the distribution of the filament number of the chopped carbon fiber bundle in the prepared carbon fiber mat.

In the prepared carbon fiber mat, a content of the carbon fiber bundle having the filament number of more than 0.5K was 99.9% by weight or more.

2.3. Experiment 3

The carbon fiber mat was prepared in the same manner as in Experiment 2 except that the two pin rollers were rotated in the opposite directions in an outward rotation mode. The outward rotation mode is a mode in which the pin rollers are each rotated so that the pin moves upward from below on a side facing the other pin roller.

Figure 12:
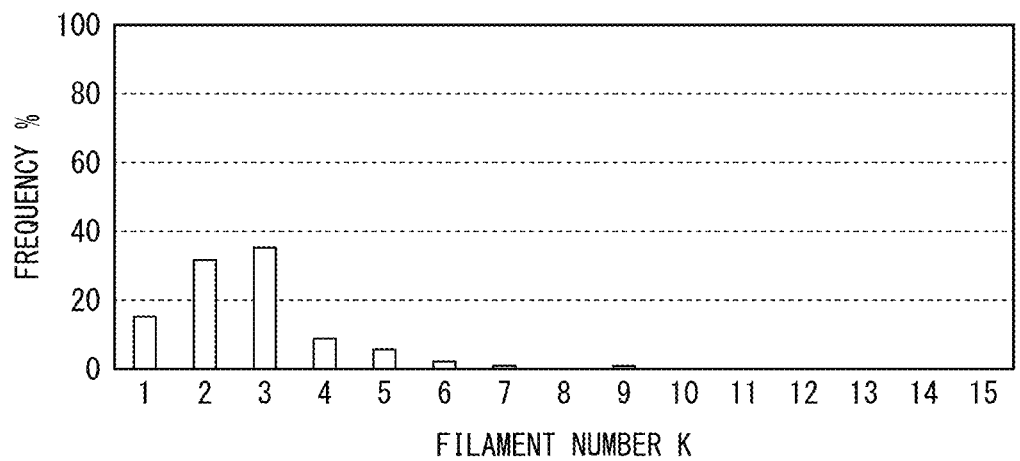
FIG. 12 is a histogram representing a distribution of filament number of chopped carbon fiber bundles in a carbon fiber mat.

FIG. 12 represents the distribution of the filament number of the chopped carbon fiber bundles in the prepared carbon fiber mat.

In the prepared carbon fiber mat, a content of the carbon fiber bundle having the filament number of more than 0.5K was 99.9% by weight or more.

2.4. Experiment 4

The carbon fiber mat was prepared in the same manner as in Experiment 2 except that the two pin rollers were rotated in the same direction.

Figure 13:
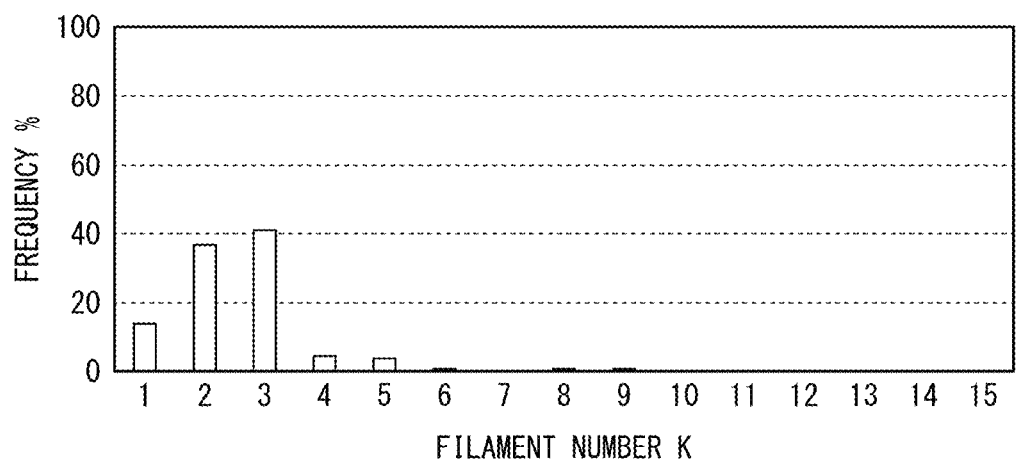
FIG. 13 is a histogram representing a distribution of filament number of chopped carbon fiber bundles in a carbon fiber mat.

FIG. 13 represents the distribution of the filament number of the chopped carbon fiber bundles in the prepared carbon fiber mat.

In the prepared carbon fiber mat, a content of the carbon fiber bundle having the filament number of more than 0.5K was 99.9% by weight or more.

2.5. Experiment 5

One of the two pin rollers was removed, and a position of the remaining one pin roller was shifted so that the chopped carbon fiber bundles falling from the rotary cutter came into contact with the remaining one pin roller with high probability. Except for the above-described configuration, the carbon fiber mat was prepared in the same manner as in Experiment 2.

Figure 14:
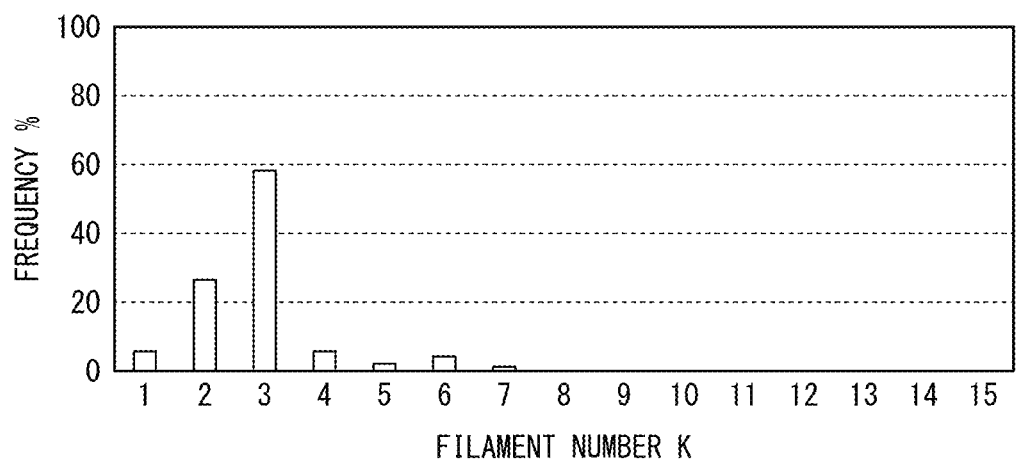
FIG. 14 is a histogram representing a distribution of filament number of chopped carbon fiber bundles in a carbon fiber mat.

FIG. 14 represents the distribution of the filament number of the chopped carbon fiber bundles in the prepared carbon fiber mat.

In the prepared carbon fiber mat, a content of the carbon fiber bundle having the filament number of more than 0.5K was 99.9% by weight or more.

2.6. Experiment 6

A square end type fiber package was formed by preparing and partially splitting a flat continuous carbon fiber bundle having the filament number of 15,000 (15K), the initial width of 8 mm and the thickness of 0.1 mm and thereafter, winding the partially split continuous carbon fiber bundle on a paper bobbin having a diameter of 82 mm and a length of 280 mm with a traverse length of 254 mm. Widening with a spreader was not performed.

A splitter having four rotary blades was used for partially splitting the continuous carbon fiber bundle. By forming four slit rows each having the slit length of 1,000 mm and the inter-slit gap length of 5 mm, the continuous carbon fiber bundle was split into five sub-bundles each having the width of 1.6 mm and partially joined to each other. Positions of inter-slit gap in the fiber direction were the same among all of the slit rows.

In winding, the lead angle at the winding start was 9.9°, the lead angle at the winding end was 5°, the winding ratio was 11.30, and the winding amount was 5.0 kg.

By adjusting a groove width of a grooved roll which the continuous carbon fiber bundle passes through after split processing, the width of the continuous carbon fiber bundle wound on the bobbin was made to be 6 mm which was 75% of the total sum of the widths of the sub-bundles. When the bobbin was pulled out from the formed fiber package and the continuous carbon fiber bundle was drawn out by internal unwinding, no particular problem was found out.

In contrast, with a fiber package prepared in the same manner, except that the width of the continuous carbon fiber bundle wound on the bobbin was made to be 8 mm which was the same as the total sum of the widths of the sub-bundles, when the bobbin was pulled out and the continuous carbon fiber bundle was drawn out by internal unwinding, frequency of occurrence of entanglement was relatively high.

The present invention has been described above with reference to specific embodiments. However, each embodiment is presented as an example, and does not limit the scope of the present invention. Each embodiment described in the present specification can be modified in various ways within the scope not departing from the concept of the invention, and can be combined with characteristics described in other embodiments to the extent practicable

REFERENCE SIGNS LIST

10: Continuous carbon fiber bundle
11: Sub-bundle
20: Chopped carbon fiber bundle
100: Fiber package manufacturing apparatus
110: Spread section
120: Split section
130: Winding section
200: SMC manufacturing apparatus
210: First resin application section
220: Second resin application section
230: Chopping section
240: Deposition section
250: Impregnation section
260: Fragmentation processing apparatus
300D: Winding diameter
$300D_B$: Bobbin diameter
$300L_T$: Traverse length
300W: Fiber bundle width
310: Fiber package
312: Fiber bundle
314: Bobbin
$\theta_{300}$: Lead angle
410: Rotation axis
412: Disk
414: Wire or rod

The invention claimed is:

1. A method of manufacturing a sheet molding compound, comprising:
   drawing out a continuous carbon fiber bundle from a package, the continuous fiber bundle having a filament number of NK and partially split into n sub-bundles in advance;
   chopping the continuous carbon fiber bundle drawn out from the package with a rotary cutter into chopped carbon fiber bundles; and
   depositing the chopped carbon fiber bundles on a carrier film traveling below the rotary cutter to form a carbon fiber mat,
   wherein in the package, the continuous carbon fiber bundle is wound so that the adjacent sub-bundles overlap each other,
   wherein a fragmentation processing is performed so that at least some of the chopped carbon fiber bundles before being deposited on the carrier film are fragmented by being brought into contact with a rotating body, and
   wherein the rotating body has a structure in which a pair of disks are connected by a plurality of wires or rods.

2. The method according to claim 1,
   wherein a total width of the continuous carbon fiber bundle wound in the package is smaller than a total sum of widths of the sub-bundles.

3. The method according to claim 1,
   wherein the filament number NK of the continuous carbon fiber bundle is 12K or more.

4. The method according to claim 1,
   wherein a content of a carbon fiber bundle having a filament number of more than 0.5K in the carbon fiber mat is 99% by weight or more.

5. The method according to claim 1,
   wherein the fragmentation processing reduces a number of the chopped carbon fiber bundle having a filament number of larger than $\{(N/n)+0.5\}K$ included in a unit weight of the carbon fiber mat.

6. The manufacturing method according to claim 1,
   wherein the carbon fiber mat is pressurized together with a thermosetting resin composition to impregnate the carbon fiber mat with the thermosetting resin composition.

7. The manufacturing method according to claim 6,
   wherein at least a part of the thermosetting resin composition is applied to an upper surface of the carrier film before the depositing of the chopped carbon fiber bundles on the carrier film.

8. A method of manufacturing a sheet molding compound, comprising:

drawing out a continuous carbon fiber bundle from a package, the continuous fiber bundle having a filament number of NK and partially split into n sub-bundles in advance;

chopping the continuous carbon fiber bundle drawn out from the package with a rotary cutter into chopped carbon fiber bundles; and depositing the chopped carbon fiber bundles on a carrier film traveling below the rotary cutter to form a carbon fiber mat, wherein in the package, a total width of the continuous carbon fiber bundle wound in the package is smaller than a total sum of widths of the sub-bundles, wherein a fragmentation processing is performed so that at least some of the chopped carbon fiber bundles before being deposited on the carrier film are fragmented by being brought into contact with a rotating body, and wherein the rotating body has a structure in which a pair of disks are connected by a plurality of wires or rods.

9. The method according to claim 8,
wherein the filament number NK of the continuous carbon fiber bundle is 12K or more.

10. The method according to claim 8,
wherein a content of a carbon fiber bundle having a filament number of more than 0.5K in the carbon fiber mat is 99% by weight or more.

11. The method according to claim 8,
wherein the fragmentation processing reduces a number of the chopped carbon fiber bundle having a filament number of larger than $\{(N/n)+0.5\}K$ included in a unit weight of the carbon fiber mat.

12. The manufacturing method according to claim 8,
wherein the carbon fiber mat is pressurized together with a thermosetting resin composition to impregnate the carbon fiber mat with the thermosetting resin composition.

13. The manufacturing method according to claim 12,
wherein at least a part of the thermosetting resin composition is applied to an upper surface of the carrier film before the depositing of the chopped carbon fiber bundles on the carrier film.

* * * * *